(12) United States Patent
Balz et al.

(10) Patent No.: US 6,877,129 B1
(45) Date of Patent: Apr. 5, 2005

(54) METHOD FOR MEASURING THE RECEIVER-SIDE BIT ERROR RATE OF A DVB TRANSMISSION SYSTEM

(75) Inventors: Christoph Balz, Munich (DE); Franz Josef Zimmermann, Marktschwaben (DE); Harald Ripp, München (DE); Josef Handl, Poing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 09/958,344
(22) PCT Filed: Mar. 29, 2000
(86) PCT No.: PCT/EP00/02772
§ 371 (c)(1),
(2), (4) Date: Nov. 14, 2001
(87) PCT Pub. No.: WO00/67418
PCT Pub. Date: Nov. 9, 2000

(30) Foreign Application Priority Data

Apr. 30, 1999 (DE) .......................................... 199 19 900
Nov. 10, 1999 (DE) .......................................... 199 54 067

(51) Int. Cl.$^7$ ............................................. H03M 13/00
(52) U.S. Cl. ..................................................... 714/784
(58) Field of Search .................................. 714/702, 784, 714/701, 704; 375/222–225, 262, 355; 370/207, 395.61; 455/522

(56) References Cited

U.S. PATENT DOCUMENTS

| | | | |
|---|---|---|---|
| 3,824,548 A | 7/1974 | Sullivan et al. ............. | 714/706 |
| 4,495,619 A * | 1/1985 | Acampora ................... | 370/207 |
| 4,566,100 A * | 1/1986 | Mizuno et al. ............. | 714/704 |
| 4,920,537 A | 4/1990 | Darling et al. ............... | 714/704 |
| 4,928,280 A | 5/1990 | Nielson et al. ............. | 714/762 |
| 5,099,482 A | 3/1992 | Cameron ...................... | 714/284 |
| 5,361,266 A | 11/1994 | Kodama et al. ............. | 714/758 |
| 5,425,033 A * | 6/1995 | Jessop et al. ................ | 714/704 |
| 5,483,236 A | 1/1996 | Bi ................................ | 341/94 |
| 5,581,577 A * | 12/1996 | Abe ............................ | 375/225 |
| 5,802,079 A | 9/1998 | Wang .......................... | 714/755 |
| 6,031,875 A * | 2/2000 | Im .............................. | 375/262 |

FOREIGN PATENT DOCUMENTS

| | | |
|---|---|---|
| DE | A14217309 | 12/1993 |
| EP | A752769 | 1/1997 |
| JP | A60170330 | 9/1985 |
| JP | A5174505 | 7/1993 |

OTHER PUBLICATIONS

Cornett et al., Bit error rate estimation technique for digital land mobile radios, 1991, IEEE, p. 543–548.*

* cited by examiner

Primary Examiner—Guy J Lamarre
Assistant Examiner—Shelly A Chase
(74) Attorney, Agent, or Firm—Birch, Stewart, Kolasch & Birch, LLP

(57) ABSTRACT

The invention relates to a method for measuring the receiver-side bit error rate of the transmission path of a DVB transmission system in which the data stream to be transmitted is channel-coded on the transmitter side by a Reed-Solomon coder and on the receiver side channel-decoder by a corresponding Reed-Solomon decoder. According to the method, a test data stream is fed in on the transmitter side and the Reed-Solomon coder is switched off so that the receiver-side decoder recognizes a data stream with non-correctable errors and allows the same to reach the output uncorrected. The bit error rate is then determined from the uncorrected test data stream.

8 Claims, 2 Drawing Sheets

METHOD FOR MEASURING THE RECEIVER-SIDE BIT ERROR RATE OF A DVB TRANSMISSION SYSTEM

This application is the national phase under 35 U.S.C. § 371 of PCT International Application No. PCT/EP00/02772 which has an International filing date of Mar. 29, 2000, and which designated the United States of America.

BACKGROUND OF THE INVENTION

1. Field of the Invention

The present invention relates to a method for measuring a receiving-end bit error rate of a transmission link (cable, satellite or terrestrial) of a DVB (digital video broadcasting) transmission system.

2. Description of the Background Art

In the DVB transmission system via cable (DVB-C), satellite (DVB-S), or via terrestrial transmitters (DVB-T) now introduced as a result of standardization, a data stream to be transmitted is fed, in accordance with FIG. 1, in a standardized MPEG2 data format to a channel encoder 2 having a Reed-Solomon encoder 3 in a transmitter 1. After passing through a filter and I/Q modulator 4, the I- and Q-components generated in the channel encoder 2 are converted from the intermediate frequency IF into the highfrequency RF range and then transmitted via cable, satellite or terrestrial transmitters as a transmission link to a receiver 10, in which, in the reverse order, the data are decoded again by a Reed-Solomon decoder 12 after conversion to the intermediate frequency IF and also filtering and I/Q demodulation in the demodulator 11. The data MPEG2 stream retrieved in this way is then decoded in an MPEG2 decoder 13 and processed further as a video and audio signal.

The DVB transmission system with its various components is known and is described in greater detail in the DVB standard ETS 300429, ETS 300421, and ETS 300744 or in Digitale Fernsehtechnik (Digital television engineering) by Reimers U. published by Springer 1997.

The Reed-Solomon encoders and decoders used in this connection are also known and are described in Digitale Fernsehtechnik (Digital television engineering) by Reimers U. published by Springer 1997, and in Error Control Coding by Lin S. and Costello D. J. published by Prentice-Hall 1983.

An important criterion for the transmission quality of such a DVB transmission system is the bit error rate. To measure the bit error rate at the receiving end, it is known to switch off the entire encoding system and, with the Reeds Solomon encoder and decoder switched off, to measure the bit error rate by injecting a test signal (EP-A-0 752 769, page 2, lines 17–22). It is furthermore known to calculate the bit error rate from the number of corrected symbols in the Reed-Solomon decoder (EP-0 752 769). The first method is very time-consuming and requires an appreciable intervention in the entire transmission system, while the second method involving the indirect determination of the bit error rate is not accurate enough.

SUMMARY OF THE INVENTION

It is therefore an object of the present invention to provide a method by which the bit error rate can be measured upstream of the Reed-Solomon decoder in a simple way without intervening in the transmission system at the receiving end.

According to the invention, to measure the bit error rate upstream of the Reed-Solomon decoder, the Reed-Solomon encoder is switched off at the transmitter end and simultaneously a test data stream is injected that has been processed in such a way that the receiving-end Reed-Solomon decoder detects the data stream as uncorrectable and lets it through to the output in uncorrected form so that the bit error rate can consequently then be measured using the uncorrected test data stream. There are various ways of generating this special test data stream. In an advantageous embodiment of the present invention, any desired useful data stream can be used for this purpose and the transmission of useful data is not disturbed for the purpose of bit error rate measurement and does not have to be interrupted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
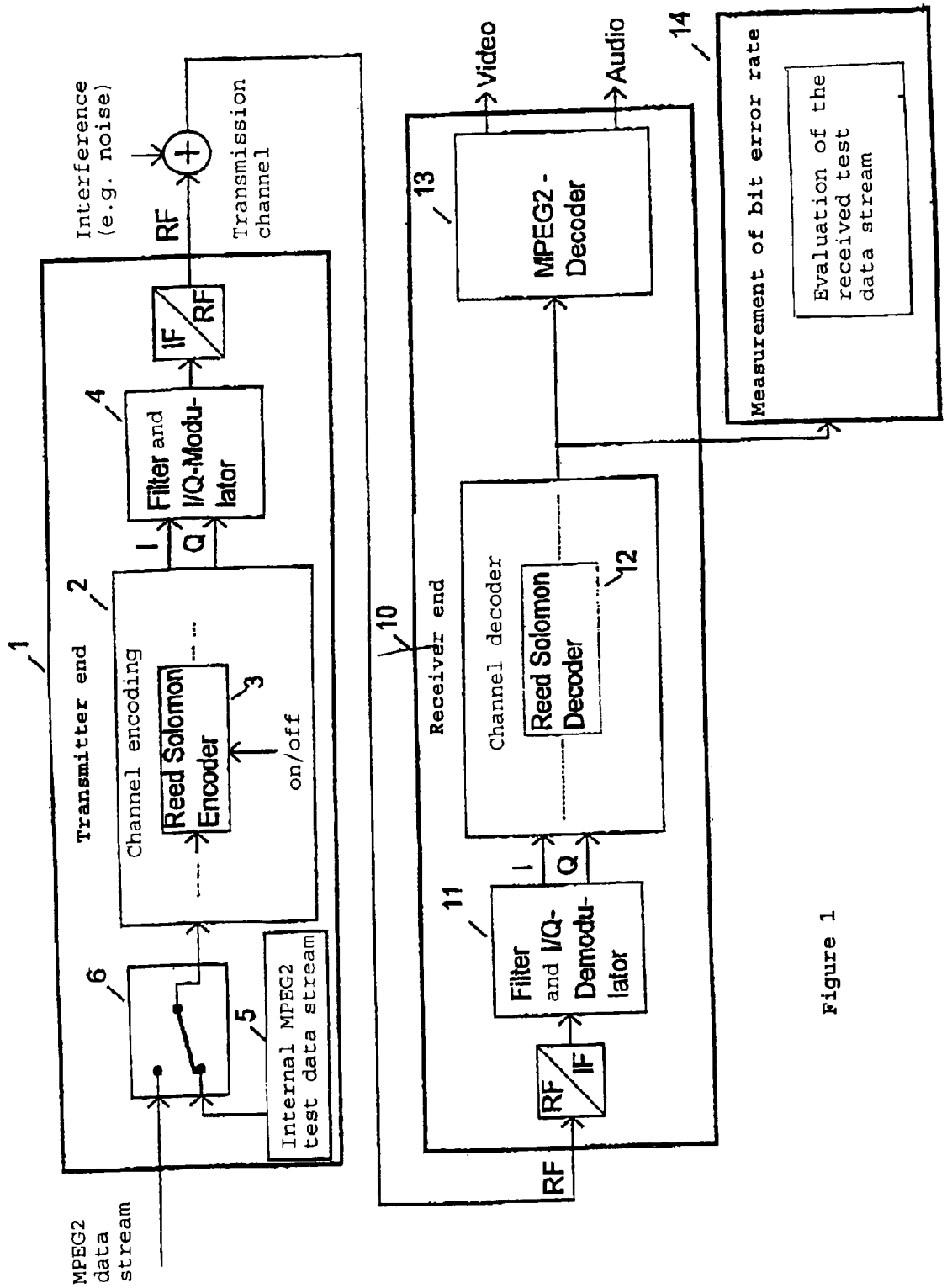
FIG. 1 is a block diagram of the present invention according to a preferred embodiment.

In FIG. 1, a special test data stream 5 is used at A transmitter end that can be fed via a switch 6 instead of the useful data stream to the channel encoder 2. The special test data stream complies with the MPEG2 standard. It has a header and a known random sequence (for example, according to CCITT 0.151) as useful data. In addition, the Reed-Solomon encoder 3 at the transmitter end is switched off and, consequently, the 16 correction bytes generated by the Reed-Solomon encoder 3 are no longer attached to every 188 bytes of the input-end MPEG2 data stream as in normal operation. Instead of the 16 correction bytes of the Reed-Solomon encoder, there are generated in the test data stream 16 test bytes that are uncorrelated with the 16 correction bytes and comprise a random distribution of zeros and ones. After traversing the transmission link, the test data stream is fed into a receiver 10 to a Reed-Solomon decoder 12 and the latter detects from the attached 16 test bytes that the latter do not accord with the preceding 188 useful bytes. This prevents an error correction on the part of the Reed-Solomon decoder 12 and, at the output of the Reed-Solomon decoder 12, there is thus outputted the uncorrected test data stream, which is compared with the test data stream injected at the transmitter end in the measuring device for measuring the bit error rate. Any standard known method, such as those described, for example, in Digitale Fernsehtechnik (Digital television engineering) by Reimers U. published by Springer 1997, is suitable for measuring the bit error rate.

Consequently, it is possible to determine the bit error rate of such a transmission system with the shortest measuring time of less than 1 second without an appropriate output being necessary upstream of the Reed-Solomon decoder 12 of the receiver and without the receiver-end Reed-Solomon decoder 12 having to be switched off.

Figure 2:
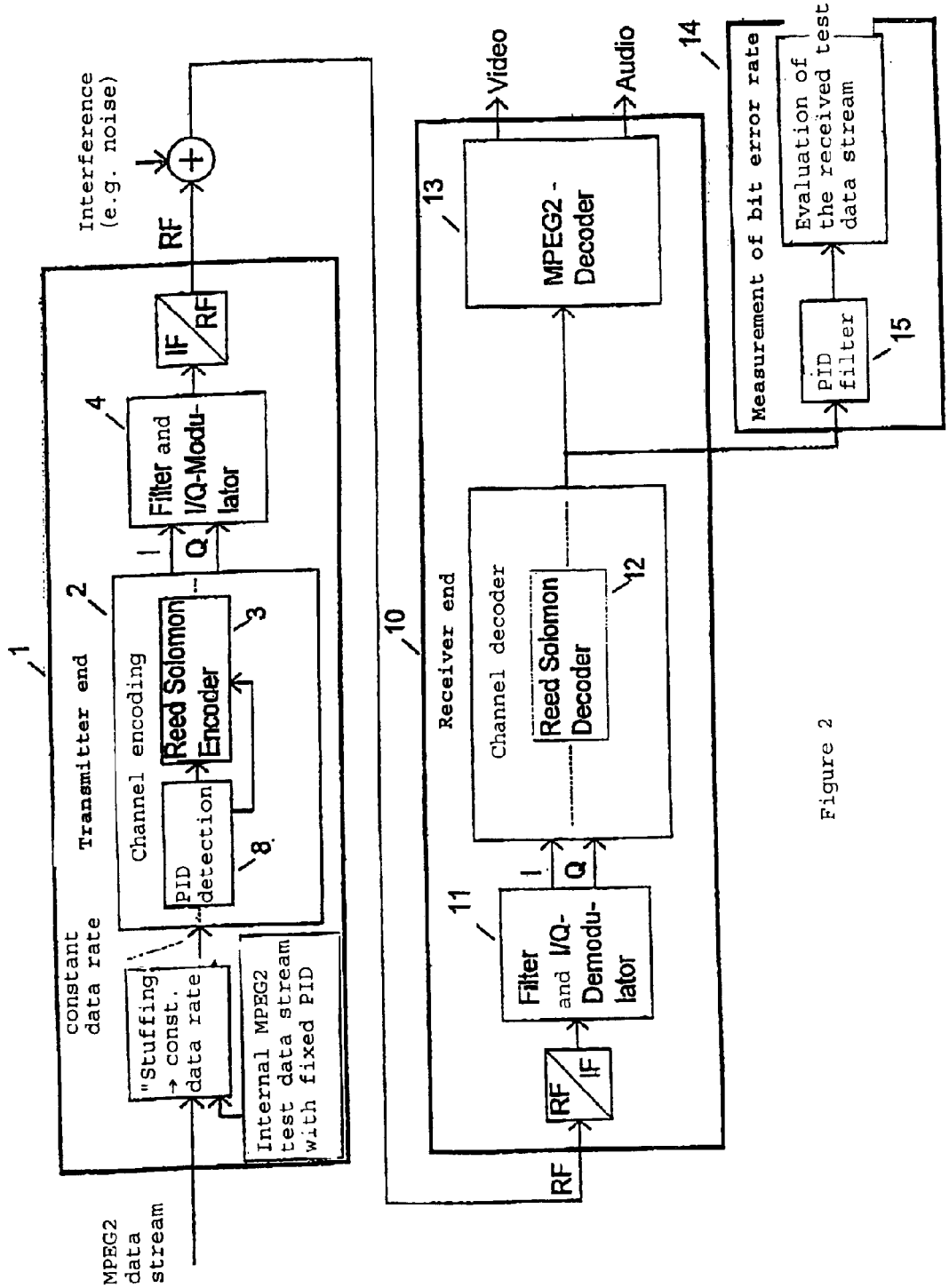
FIG. 2 is a block diagram of the present invention according to an alternate embodiment.

FIG. 2 shows another way of generating the uncorrectable test data stream. The procedure that is standard in such DVB transmission systems is used, namely to make up the useful data generated upstream of the Reed-Solomon encoder 3 at the transmitter end to the bit rate required for the transmission method so that a constant data rate is transmitted via the transmitter. For this purpose, the useful-data packets that are characterized in the header in accordance with various transmitted DVB programmes (video or audio) by appropriate PID (programme identification data) are supplemented with zerodata packets that are likewise characterized as such by a defined PID identifier, in general by a 1FFF hex data sequence. The zero-data packets serving only for making up are not evaluated further in the decoder 12, but are discarded. The zero-data packets are therefore used for the bit error rate measurement by filling them with a sequence of test data, for example with a 111. . . data sequence, preferably, however, with a known PRBS (pseudorandom bit sequence) random sequence. In the encoder 3 at the transmitter end there is a PID filter 8 that detects whether a useful-data packet to be encoded or a zero-data packet is involved. If a zero-data packet is recognized the Reed-Solomon encoder 3 is switched off for the zerodata packet.

The Reed-Solomon decoder 12 at the receiving end then detects all of the zero-data packets as subject to uncorrectable errors and therefore lets them through unaltered so that the bit error rate can be determined from them in the measuring device 14 at the output of the decoder 12. Only in the case of received useful-data packets are any errors corrected upstream of the Reed-Solomon decoder 12 by the latter and, consequently, an optimum transmission that is not disturbed by the test data sequence continues to be ensured for the useful-data packets.

With the Reed-Solomon encoder 3 switched off, the 16 correction bits generated by the standardized encoder are no longer attached at the transmitter end to every 188 bytes of the input-end MPEG2 data stream as in normal operation, but 16 bytes are generated that are uncorrelated with the 16 correction bytes of the encoder and comprise a random distribution of zeros and ones. Any standard known method, for example the one described in Digitale Fernsehtechnik (Digital television engineering) by Reimers U. published by Springer 1997, is suitable for measuring the bit error rate.

Provided in the receiving-end measuring arrangement 14 for determining the bit error rate is a PID filter 15 so that only such uncorrected zero-data are evaluated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for measuring a receiving-end bit error rate of a transmission link of a DVB transmission system in which a data stream that is to be transmitted is channel-encoded at a transmitter end by a Reed-Solomon encoder and is channel-decoded at a receiving end by a corresponding Reed-Solomon decoder, the method comprising the steps of:

injecting a test data stream at the transmitter end;

switching off the Reed-Solomon encoder at the transmitter end so that the receiving-end decoder detects an uncorrected test data stream containing uncorrectable errors and lets it through to an output in uncorrected form; and determining the bit error rate using the uncorrected test data stream.

2. The method according to claim 1, wherein the bit error rate is measured by comparing the uncorrected test data stream that is outputted at the output of the decoder with the test data stream injected at the transmitter end.

3. The method according to claim 1, wherein a test data stream that complies with the MPEG2 standard is injected at the transmitter end and, instead of correction bytes generated by the Reed-Solomon encoder per data stream frame in normal operation, a corresponding number of uncorrelated and randomly distributed test bytes is attached so that, with the transmitter-end encoder switched off, the receiving-end decoder lets said test data stream through to the output in uncorrected form.

4. The method according to claim 1, wherein the test data stream is generated in such a way that there is added to a useful data stream, which complies with the MPEG2 standard and whose useful-data packets have identification data at the transmitter end upstream of the Reed-Solomon encoder, a test data stream whose packets are correspondingly characterized as zerodata packets so that, with the Reed-Solomon encoder switched off, the receiving-end decoder lets said test data stream through to the output in uncorrected form.

5. The method according to claim 4, wherein there is provided in the Reed-Solomon encoder an identification data code filter that, on recognizing a zero-data packet, switches off the Reed-Solomon encoder so that uncorrectable data are transmitted.

6. The method according to claim 4, wherein a corresponding identification data code filter is provided at the receiving end upstream of the bit error rate measuring device and only the data packets detected as zero-data packets are evaluated for the purpose of bit error rate determination.

7. The method according to claim 4, wherein, in the case of zero-data packets, the bytes generated by the Reed-Solomon encoder are replaced by a data sequence of uncorrelated, randomly distributed data.

8. A method for measuring a bit error rate between a transmitter and a receiver of a DVB transmission system, the method comprising:

inserting a test data stream at a transmitter input end having a random distribution of zeros and ones;

switching off a Reed-Solomon encoder, the Reed-Solomon encoder being provided in the transmitter;

transmitting the test data stream to the receiver;

detecting the transmitted test data stream by a Reed-Solomon decorer, the Reed-Solomon on decoder being provided in the receiver;

preventing an error correction of the test data stream by the Reed-Solomon decorer on the basis of the detected transmitted test data stream;

outputting the transmitted data stream as an uncorrected data stream by the Reed-Solomon decoder to a measuring device; and comparing, in the measuring device, the test data stream inputted at the transmitter input end with the uncorrected data stream outputted by the Reed-Solomon decoder to thereby determine the bit error rate of the DVB transmission system.

\* \* \* \* \*

UNITED STATES PATENT AND TRADEMARK OFFICE
CERTIFICATE OF CORRECTION

PATENT NO.     : 6,877,129 B1
DATED          : April 5, 2005
INVENTOR(S)    : Christoph Balz et al.

It is certified that error appears in the above-identified patent and that said Letters Patent is hereby corrected as shown below:

<u>Title page,</u>
Item [75], Inventors, correct name of 4$^{th}$ inventor from "Josef Handi" to -- Josef Handl --

Signed and Sealed this

Ninth Day of August, 2005

JON W. DUDAS
*Director of the United States Patent and Trademark Office*